Sept. 18, 1951  R. S. WAGNER  2,568,043
BARBED FASTENING PRONG
Filed July 9, 1948

*INVENTOR.*
ROBERT S. WAGNER
BY
John W. Michael
ATTORNEY

Patented Sept. 18, 1951

2,568,043

UNITED STATES PATENT OFFICE 2,568,043

BARBED FASTENING PRONG

Robert S. Wagner, Milwaukee, Wis., assignor to E. R. Wagner Manufacturing Company, Milwaukee, Wis., a corporation of Wisconsin Application July 9, 1948, Serial No. 37,938

1 Claim. (Cl. 85—11)

This invention relates to improvements in barbed fastening prongs for hinges, locks, angle clamps, corner brackets, and other devices for joining members.

Such fastening prongs are usually driven or forced into the material of members to be joined. In some instances the material may be provided with a routing for facilitating the entry of the prong. It has been the practice to make the barbs on such prongs by cutting a V-shaped cut in the metal body of the prong and bending the cut portion out from the body of the material. Barbs so constructed depend entirely on the resistance of the metal at the relatively straight bend line between the barb and the body to provide sufficient stiffness to make the barbs bite into and grip the material and prevent collapse thereof. It is impractical to provide such resistance when the prong is made of a relatively thin metal and hence the barbed prongs now used are not efficient when used on devices for light-weight articles, such as jewelry boxes and the like.

It is therefore an object of this invention to provide a relatively thin barbed fastening prong which will be stiff and have high holding power.

Another object of the invention is to provide a barbed prong with high holding power which may be easily and inexpensively formed from the metal of the body of the prong.

These objects are accomplished by a barbed prong which has an aperture or a series of apertures through its body and a portion of the metal of the body around such aperture or apertures protruding from the side of the body to form a barb or barbs. Such a barb is not bent from the body of the prong along a straight bending line. The bending line between the protruding barb is either substantially circular or made of sections at angles to each other so that it supports the barb substantially from opposite sides thereof. This so strengthens the barb that it will not collapse under the pressure exerted against it when the prong is inserted. A portion of the interior wall of the aperture also projects beyond the side of the body to provide a material-contacting surface for preventing withdrawal of the barb. However, the sloping portion between the barb and the body permits the prong and barb to be inserted in the material with ease.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Figure 1:
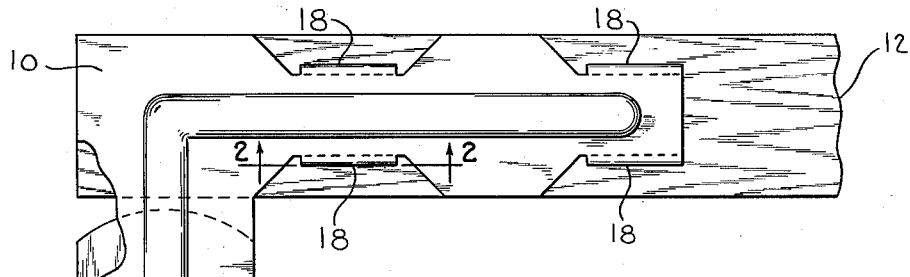
Fig. 1 is a view in top elevation of an angle piece with barbed prongs embodying the present invention.
Figure 2:
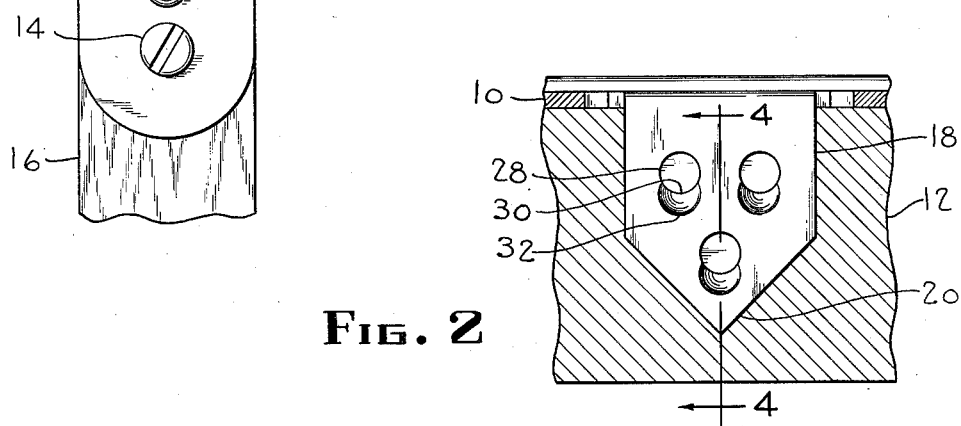
Fig. 2 is an enlarged fragmentary sectional view taken on the line 2—2 of Fig. 1.
Figure 4:
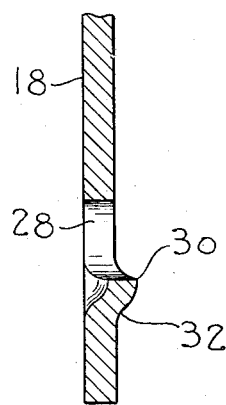
Fig. 4 is an enlarged fragmentary sectional view taken on the line 4—4 of Fig. 2.

Referring to the drawing by reference numerals, the angle piece 10 is shown with one leg secured to the edge of a wooden member 12 and its other leg hingedly supporting by means of a screw 14 another wooden member 16. The angle piece 10 is provided with depending barbed fastening prongs 18 inset inwardly from the outer edges of the piece 10 to have the prongs 18 spaced inwardly from the sides of the wooden member 12. The barbed prong 18, as shown in this example, is provided with a point 20 to facilitate its entry into the member 12.

Figure 3:
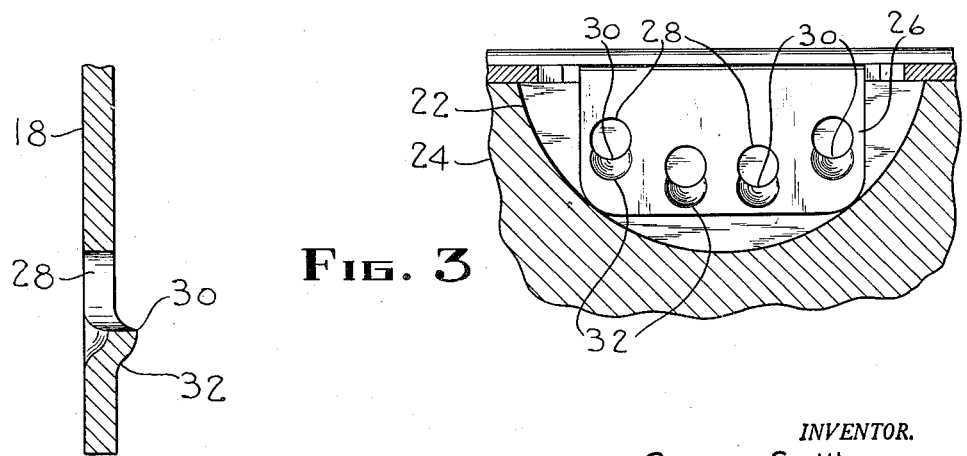
Fig. 3 is a view of a modified form of barbed prong embodying the present invention.

In instances where a wide prong is needed, or the member in which the barbed prong is to be inserted is thin, it is advisable to provide such member with a routing. In the modification viewed in Fig. 3 a routing 22 is first formed in the material 24 before the barbed prong is inserted to facilitate its entry.

Whether the barbed prong is driven directly into the material, or whether it is forced into a previously prepared routing therein, the barbs must engage and bite into the material to prevent the prong from being withdrawn. To form the barbed prong a round aperture 28 is first cut or punched through the metal body of the prong 18 and then a portion of the interior wall of the aperture is forced laterally of the body so that one edge only of said portion protrudes beyond the side of the body. As this is done the metal around part of such aperture will bulge outwardly on one side and recess on the other side of the body thus forming the barb 30. The bending line 32 between the barb 30 and the flat body is substantially circular and extends angularly for approximately 180° or over, thus providing support for the barb 30 on opposite sides. This provides support for the barb and prevents it from collapsing under the lateral pressure exerted when the prong is forced into the material. The protruding part of the interior wall of the aperture 28 forms a curved material-engaging area which grips the material preventing removal of the prong. This area has a sharp outer edge. In fact the edge has a slight burr resulting from piercing the aperture before the drawing of the barb. This edge bites into the material in which the prong is inserted and greatly increases the holding power of the barb. The curved shape of this area not only provides a relatively large material-gripping area but also aids in the gripping action. The punching or cutting of the hole and the offsetting of the barb may be done by a "progressive die" in a single pressing operation.

In some instances the barbed prong may be covered with a resin nail coating prior to inserting it in the material. When the barbs are all protruding from one side of the prong they throw its flat opposite face against the material and the coating creates a strong adhesive action between such side and the material.

The barbed prongs herein described may be made of relatively thin metal, say approximately $\frac{1}{32}$ of an inch or less. Because of the unusual support for the barb it will not collapse under pressure. Thin prongs with strong barbs materially increase the field of use of member-holding devices so equipped. However, while the barbed prong constructed as described herein is highly useful when it is relatively thin, a thick prong with such barbs can be used just as well and be just as effective in connection with larger devices. The number of barbs used on the barbed prong depends entirely upon the characteristics of the material into which the prong is to be driven and the selection thereof is a function of the designer.

Although only one embodiment of the invention is shown and described herein, it will be understood that this application is intended to cover such changes or modifications as come within the spirit of the invention or scope of the following claim.

I claim:

A barbed prong for securing devices to wood comprising a relatively thin flat metal body, a round aperture through said body, a portion of the metal of said body partly surrounding said aperture being formed to protrude beyond the side of said body with only one edge of said portion extending beyond said side to cause a portion of the interior wall of said aperture to present a curved wood-engaging surface for preventing withdrawal of said prong, the metal between said surface and the side of said body sloping gradually out from said side to permit said prong to be easily inserted.

ROBERT S. WAGNER.

REFERENCES CITED

The following references are of record in the file of this patent:

UNITED STATES PATENTS

| Number | Name | Date |
|---|---|---|
| 1,845,522 | Rowley | Feb. 16, 1932 |
| 1,979,748 | Kimmel | Nov. 6, 1934 |
| 2,156,682 | Dimoush | May 2, 1939 |
| 2,346,625 | Stuber | Apr. 11, 1944 |
| 2,380,916 | Beal | Aug. 7, 1945 |